United States Patent
Yoshihara (10) Patent No.: US 9,628,244 B2
(45) Date of Patent: Apr. 18, 2017

(54) COMMUNICATIONS SYSTEM, ON-VEHICLE ELECTRONIC DEVICE AND COMMUNICATION METHOD

(71) Applicant: TOYOTA JIDOSHA KABUSHIKI KAISHA, Toyota-shi, Aichi (JP)

(72) Inventor: Toru Yoshihara, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/654,860

(22) PCT Filed: Feb. 13, 2014

(86) PCT No.: PCT/JP2014/053960
§ 371 (c)(1),
(2) Date: Jun. 23, 2015

(87) PCT Pub. No.: WO2014/129520
PCT Pub. Date: Aug. 28, 2014

(65) Prior Publication Data
US 2015/0349935 A1 Dec. 3, 2015

(51) Int. Cl.
H04L 5/00 (2006.01)
H04B 1/3822 (2015.01)
B60R 25/24 (2013.01)
H04W 4/04 (2009.01)
H04W 4/20 (2009.01)

(52) U.S. Cl.
CPC ............ *H04L 5/0055* (2013.01); *B60R 25/24* (2013.01); *H04B 1/3822* (2013.01); *H04L 5/0048* (2013.01); *H04W 4/046* (2013.01); *H04W 4/20* (2013.01)

(58) Field of Classification Search
CPC ... H04L 5/0055; H04L 5/0048; H04B 1/3822; H04W 4/20; H04W 4/046; B60R 25/24
See application file for complete search history.

(56) References Cited

U.S. PATENT DOCUMENTS

| | | | |
|---|---|---|---|
| 2003/0043023 A1* | 3/2003 | Perraud | G06K 7/0008 340/10.1 |
| 2008/0208405 A1* | 8/2008 | Alrabady | H04W 52/0229 701/36 |
| 2009/0150310 A1* | 6/2009 | Okada | B60C 23/0408 706/12 |

(Continued)

FOREIGN PATENT DOCUMENTS

| | | |
|---|---|---|
| JP | 2009-276875 A | 11/2009 |
| JP | 2011-234260 A | 11/2011 |

*Primary Examiner* — Jung Park
(74) *Attorney, Agent, or Firm* — Sughrue Mion, PLLC (57) ABSTRACT

An on-vehicle electronic device creates a first signal and a second signal, and designates the number of times of transmitting the second signal. When noise is generated, the first signal includes information indicating a period of time to receive a signal by the portable device longer than that when noise is not generated. When noise is generated, the number of times of transmitting the second signal to a portable device by the on-vehicle electronic device to be designated is larger than that when noise is not generated. For the period of time to receive a signal indicated by the first signal, the portable device receives a signal.

11 Claims, 6 Drawing Sheets

(56) References Cited

U.S. PATENT DOCUMENTS

2010/0052845 A1\* 3/2010 Yamamoto .............. B60R 25/24
340/5.8
2012/0031155 A1\* 2/2012 Shimura ............. E05B 19/0082
70/408

\* cited by examiner

| WAKE-UP BURST | START BIT | PATTERN (6 BITS) | WAKE-UP TIME SWITCHING DESIGNATION BITS |
|---|---|---|---|

COMMUNICATIONS SYSTEM, ON-VEHICLE ELECTRONIC DEVICE AND COMMUNICATION METHOD

CROSS REFERENCE TO RELATED APPLICATIONS

This application is a National Stage of International Application No. PCT/JP2014/053960 filed Feb. 13, 2014, claiming priority based on Japanese Patent Application No. 2013-032141 filed Feb. 21, 2013, the contents of all of which are incorporated herein by reference in their entirety.

TECHNICAL FIELD

The present invention relates to a communications system.

BACKGROUND ART

A function in a vehicle is known with which it is possible to lock or unlock a vehicle door or start up an engine without using a mechanical key. The function is called a "smart entry & start system" or a "smart key system".

In a smart key system, communications are carried out between a portable device (key) and an Electronic Control Unit (ECU) or a Body Control Module (BCM) mounted in a vehicle. In a case where communications have been established between the portable device and the ECU or BCM, locking or unlocking a door, or starting up the engine can be accomplished.

A portable device is known that waits for a wake-up signal with first receiving sensitivity lower than second receiving sensitivity, and prevents erroneous starting up that may otherwise occur due to a signal other than the wake-up signal, i.e., due to a signal that is noise for the portable device (for example, see Japanese Laid-Open Patent Application No. 2011-234260).

SUMMARY OF INVENTION

In a smart key system, when a portable device has received a wake-up signal from an on-vehicle device, the portable device transmits an affirmative response signal (ACK signal) to the on-vehicle device. The on-vehicle device that has received the affirmative response signal from the portable device then transmits an encrypted communication code. Thereafter, in a case of not having received a response to the encrypted communication code, the on-vehicle device carries out retry that starts from transmission of a wake-up signal.

According to the related art, a period of time for the portable device to receive a signal from the on-vehicle device is previously set. In a case of not having received an affirmative response signal from the portable device, the on-vehicle device needs to carry out, during the previously set period of time, retry of transmitting a wake-up signal and retry of transmitting an encrypted communication code. In this regard, note that the portable device may have already entered a state of not being able to receive a signal due to an elapse of the previously set period of time for the portable device to receive a signal when the on-vehicle device carries out of transmitting a signal. Therefore, only by increasing the number of times of retry of transmitting a wake-up signal and increasing the number of times of retry of transmitting an encrypted communication code, it may be still difficult to establish communications by the on-vehicle device with the portable device.

An object of the present invention is to increase the frequency of establishing communications between the portable device and the on-vehicle device.

In order to achieve the object, a communications system according to an embodiment includes an on-vehicle electronic device; and a portable device that communicates with the on-vehicle electronic device. The on-vehicle electronic device includes a signal creation part that creates a first signal that causes the portable device to enter a state of being able to carry out reception and a second signal to be transmitted to the portable device, a transmission number of times designation part that designates the number of times of transmitting the second signal, and a transmission control part that controls transmission of the first signal and transmission of the second signal. The signal creation part creates the first signal that includes information for setting a period of time of causing the portable device to enter the state of being able to carry out reception in a state of noise being generated longer than one that is set in a state of noise not being generated, the transmission number of times designation part designates the number of times of transmitting the second signal in the state of noise being generated greater than one that is designated in the state of noise not being generated, and the transmission control part controls transmission of the second signal based on the number of times of transmitting the second signal designated by the transmission number of times designation part. The portable device includes a reception waiting time setting part that sets, according to the period of time of causing the portable device to enter the state of being able to carry out reception included in the first signal from the on-vehicle electronic device, a period of time of entering a state of being able to carry out reception.

An on-vehicle electronic device according to an embodiment communicates with a portable device, and includes a signal creation part that creates a first signal that causes the portable device to enter a state of being able to carry out reception and a second signal to be transmitted to the portable device, a transmission number of times designation part that designates the number of times of transmitting the second signal, and a transmission control part that controls transmission of the first signal and transmission of the second signal. The signal creation part creates the first signal that includes information for setting a period of time of causing the portable device to enter the state of being able to carry out reception in a state of noise being generated longer than one that is set in a state of noise not being generated, the transmission number of times designation part designates the number of times of transmitting the second signal in the state of noise being generated greater than one that is designated in the state of noise not being generated, and the transmission control part controls transmission of the second signal based on the number of times of transmitting the second signal designated by the transmission number of times designation part.

A communication method according to an embodiment is carried out in a communications system that includes an on-vehicle electronic device, and a portable device that communicates with the on-vehicle electronic device. The communication method includes creating, by the on-vehicle electronic device, a first signal that causes the portable device to enter a state of being able to carry out reception and a second signal to be transmitted to the portable device; designating, by the on-vehicle electronic device, the number of times of transmitting the second signal; and controlling, by the on-vehicle electronic device, transmission of the first signal and transmission of the second signal. In the creating, the first signal is created that includes information for setting a period of time of causing the portable device to enter the state of being able to carry out reception in a state of noise being generated longer than one that is set in a state of noise not being generated. In the designating, the number of times of transmitting the second signal is designated in the state of noise being generated larger than one that is designated in the state of noise not being generated. In the controlling, transmission of the second signal is controlled based on the designated number of times of transmitting the second signal. The communication method further includes setting, by the portable device, according to the period of time of causing the portable device to enter the state of being able to carry out reception included in the first signal from the on-vehicle electronic device, a period of time of entering a state of being able to carry out reception.

A communication method according to an embodiment is carried out by an on-vehicle electronic device that communicates with a portable device. The communication method includes creating a first signal that causes the portable device to enter a state of being able to carry out reception and a second signal to be transmitted to the portable device; designating the number of times of transmitting the second signal; and controlling transmission of the first signal and transmission of the second signal. In the creating, the first signal is created that includes information for setting a period of time of causing the portable device to enter the state of being able to carry out reception in a state of noise being generated longer than one that is set in a state of noise not being generated. In the designating the number of times of transmitting the second signal is designated in the state of noise being generated larger than one that is designated in the state of noise not being generated. In the controlling, transmission of the second signal is controlled based on the designated number of times of transmitting the second signal.

According to the embodiments, it is possible to increase the frequency of establishing communications between the portable device and the on-vehicle device.

Other objects, features and advantages of the present invention will become more apparent from the following detailed description when read in conjunction with the accompanying drawings.

DESCRIPTION OF EMBODIMENTS

Next, a mode for carrying out the present invention will be described based on embodiments using the drawings.

Note that, throughout the drawings for describing the embodiments, the same reference numerals are given to elements having the same functions, and duplicate description will be omitted.

EMBODIMENT

Communications System

Figure 1:
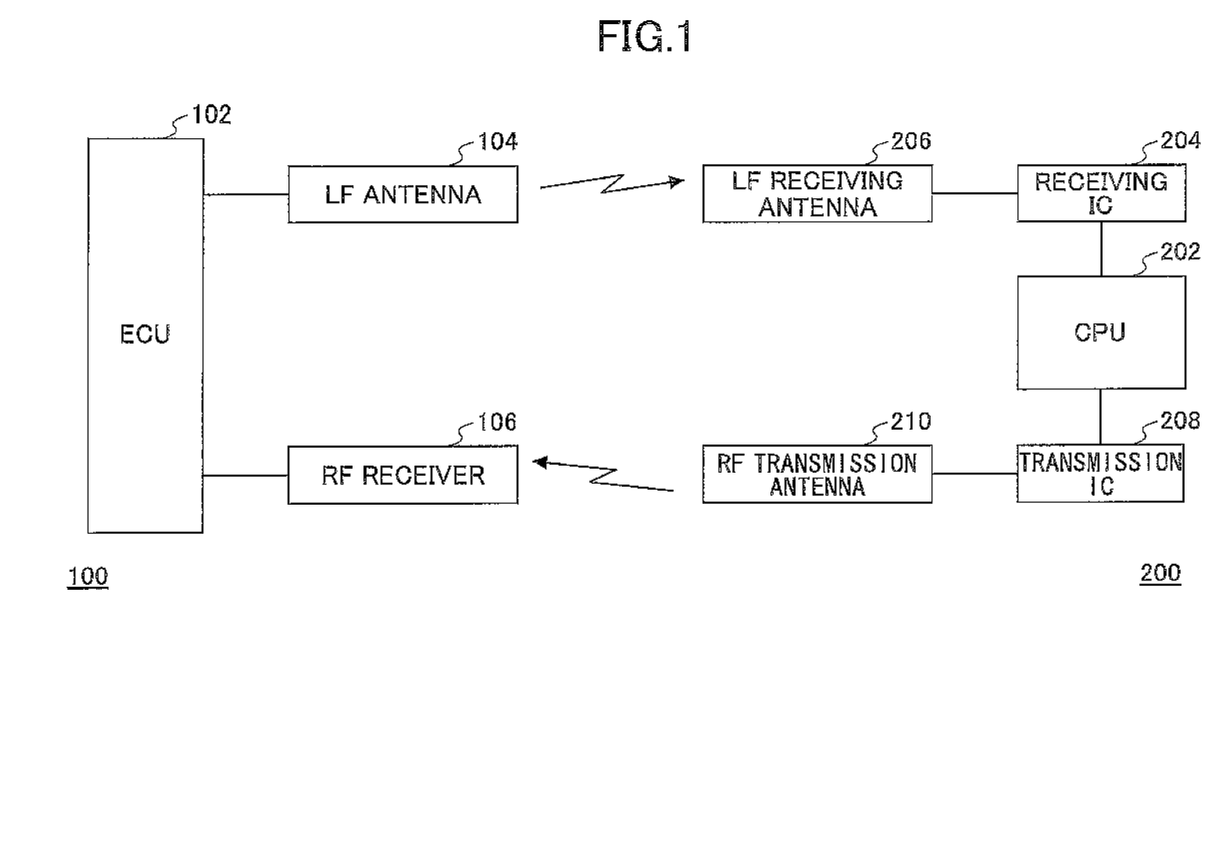
FIG. 1 shows a communications system according to an embodiment.

FIG. 1 shows a communications system according to an embodiment.

The communications system includes an on-vehicle electronic device 100 and a portable device 200.

Figure 2:
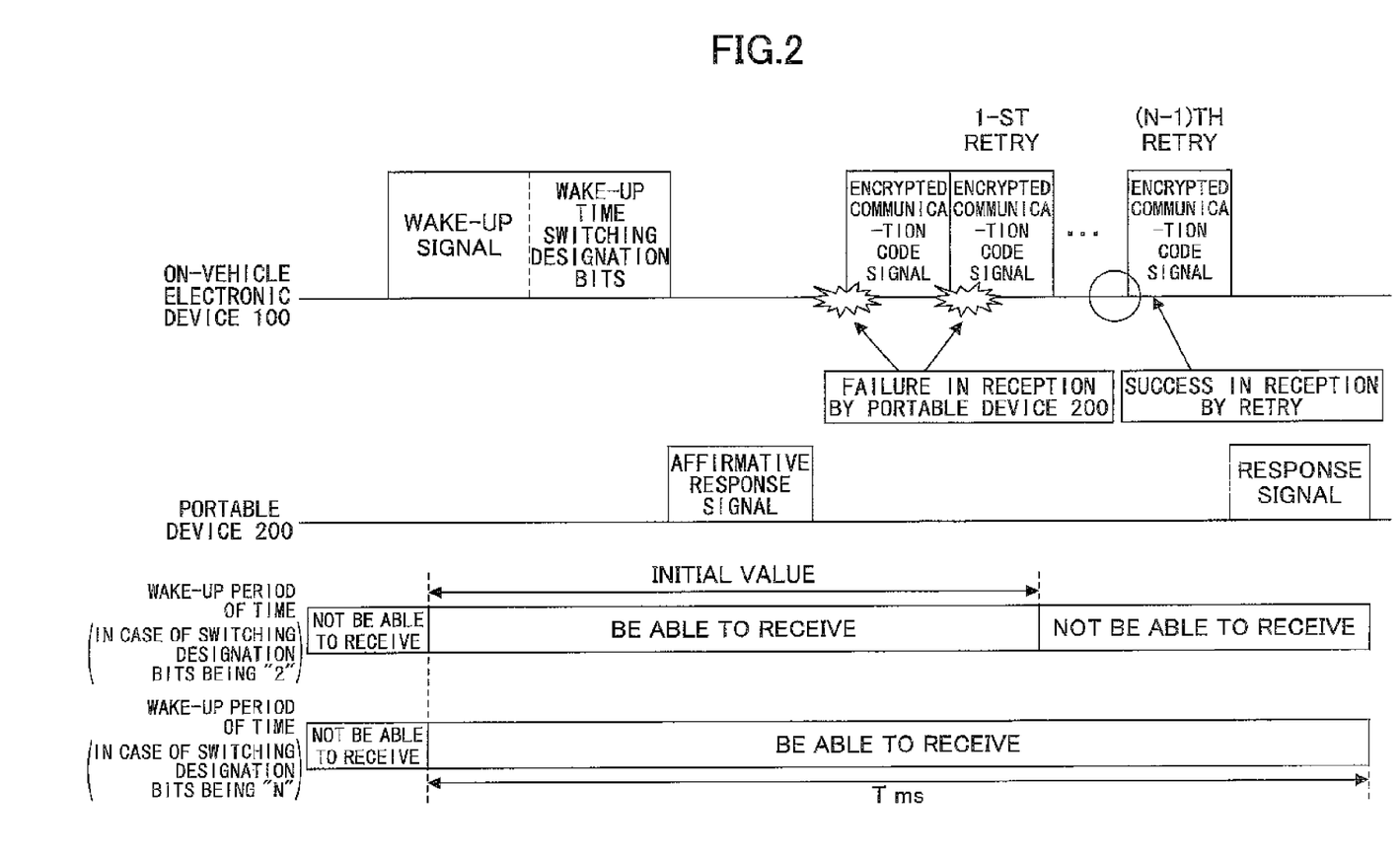
FIG. 2 shows operations in the communications system according to the embodiment.

FIG. 2 shows operations in the communications system.

The on-vehicle electronic device 100 is mounted in a movable body such as a vehicle. The on-vehicle electronic device 100 according to the embodiment will now be described assuming a case where it is mounted in a vehicle as mentioned above. The on-vehicle electronic device 100 sets the number of times of a trial of transmitting an encrypted communication code that the on-vehicle electronic device 100 transmits, depending on a state in the vehicle. Specifically, it is preferable that the on-vehicle electronic device 100 designates, as the number of times of a trial of transmission, "two" times or "N" ("N" is an integer and is greater than "2") times. It is preferable that the specific value of "N" is previously set in the on-vehicle electronic device based on the probability of receiving by the portable device 200 the encrypted communication code from the on-vehicle electronic device 100 and the power consumed by the portable device 200 during a period of time of transmitting the encrypted communication code by the on-vehicle electronic device 100 N times. Specifically, it is preferable that the value of N is previously set through a simulation.

The on-vehicle electronic device 100 transmits a wake-up signal to the portable device 200. The wake-up signal is a signal that causes the portable device 100 to enter a state of being able to receive a signal. That is, the on-vehicle electronic device 100 according to the embodiment transmits the wake-up signal that includes information designating a period of time of causing the portable device 200 to enter a reception waiting state (hereinafter, referred to as a "reception waiting period of time") for causing the portable device 200 to receive the encrypted communication code. That is, the on-vehicle electronic device 100 transmits the wake-up signal including "wake-up time switching designation bits" directing the portable device 200 to enter a reception waiting state for a period of time of transmitting the encrypted communication code two times or N times. It is preferable that information indicating "2" or "N" is set as the wake-up time switching designation bits.

When having received the wake-up signal from the on-vehicle electronic device 100, the portable device 200 transmits an affirmative response signal (ACK signal) to the on-vehicle electronic device 100 responding to the wake-up signal. Further, the portable device 200 sets the "reception waiting period of time" according to the "wake-up time switching designation bits" included in the wake-up signal. In a case where the wake-up time switching designation bits indicate "2", the portable device 200 continues to be in a state of having the reception waiting period of time that has been set to be an initial value. In a case where the wake-up time switching designation bits indicate "N", the portable device 200 changes the reception waiting period of time into a period of time on the order for the on-vehicle electronic device 100 to transmit the encrypted communication code N times (hereinafter, referred to as a "reception waiting period of time T"). The portable device 200 waits for a signal from the on-vehicle electronic device 100 for the reception waiting period of time that has been thus set.

In the example shown in FIG. 2, in a case where the wake-up time switching designation bits indicate "2", the reception waiting period of time is kept as the initial value. As the reception waiting period of time, in many cases, such a period of time is set that the on-vehicle electronic device 100 transmits the encrypted communication code on the order of two times. Therefore, since the reception waiting period of time is kept as the initial value in this case, the portable device 200 enters a state of not being able to carry out reception at a time when the encrypted communication code has been transmitted from the on-vehicle electronic device 100 two times. Note that the transmission of the encrypted communication code two times means that, after the first transmission of the encrypted communication code, a first retry of transmission of the encrypted communication code has been carried out.

On the other hand, in a case where the wake-up time switching designation bits indicate "N", the reception wanting period of time is changed into the reception waiting period of time T. This means that, even at a time when transmitting the encrypted communication code has been carried out N times by the on-vehicle electronic device 100, the portable device 200 is still in a state of being able to carry out reception. Therefore, the portable device 200 can receive the encrypted communication code transmitted by the on-vehicle electronic device 100 in the N-th transmission. Note that the N times of transmitting the encrypted communication code means that after the first transmission of a encrypted communication code, N−1 times of retry of transmission have been carried out.

The portable device 200 that has received the encrypted communication code transmitted in the N-th transmission then transmits a response signal to the on-vehicle electronic device 100.

<On-vehicle Electronic Device 100>

As shown in FIG. 1, the on-vehicle electronic device 100 includes an ECU 102, a LF antenna 104 and a RF receiver 106.

The LF antenna 104 carries out wireless transmission of a signal from the ECU 102 through a Low Frequency (LF) band. Electric waves in the LF band include electric waves having frequencies in a range between 30 kHz and 300 kHz.

The RF receiver 106 receives a signal transmitted by the portable device 200 wirelessly in an Ultra High Frequency (UHF) band, and inputs the received signal in the ECU 102. UHF may also be called as a Radio Frequency (RF). Electric waves in the UHF band include electric waves in the range between 300 MHz and 3 GHz.

The ECU 102 is connected with the LF antenna 104 and the RF receiver 106. It is preferable that the ECU 102 includes a Micro Controller Unit (MCU) (not shown) and a transceiver (not shown).

The MCU preferably includes one or a plurality of microcomputers. Instead of the microcomputer(s), a CPU(s) may be included. Also, a microcomputer(s) and a CPU(s) may be mixed in the MCU. Further, the MCU includes a communication device (not shown). The communication device preferably carries out serial communications with the transceiver. Specifically, the communication device may be a Universal Asynchronous Receiver Transmitter (UART).

The transceiver is connected with the MCU and a communication bus (not shown). The transceiver transmits data that has been input from the MCU into the communication bus, and inputs data from the communication bus into the MCU.

Also, the ECU 102 may have a plurality of MCUs. Further, the ECU 102 may have a plurality of transceivers.

<Functions of on-Vehicle Electronic Device 100>

Figure 3:
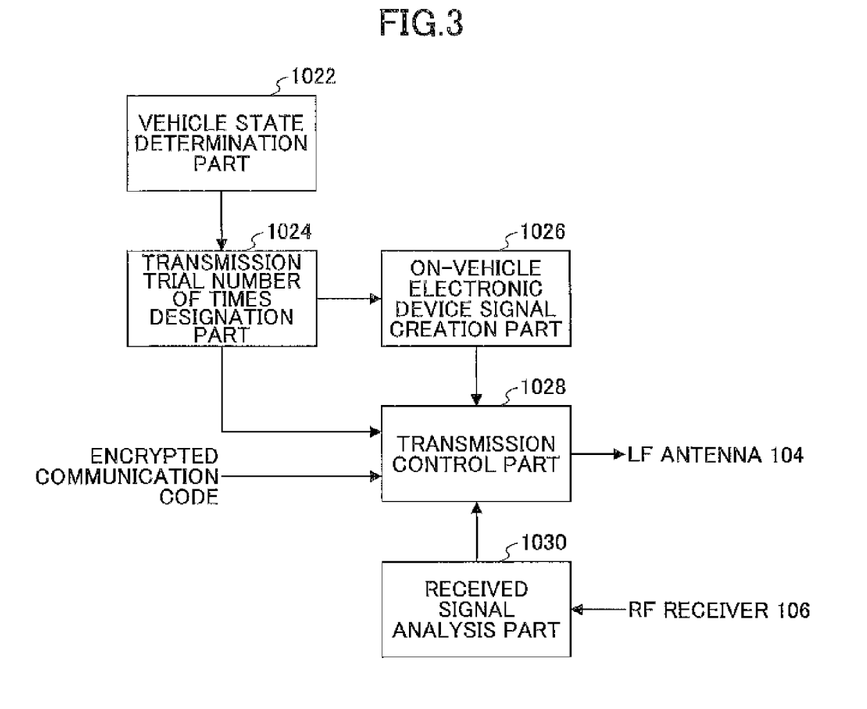
FIG. 3 is a functional block diagram showing an on-vehicle electronic device according to the embodiment.

FIG. 3 is a functional block diagram showing the on-vehicle electronic device 100 according to the embodiment.

The functions shown in the functional block diagram of FIG. 3 are implemented mainly by the MCU. That is, the MCU functions as a vehicle state determination part 1022, a transmission trial number of times designation part 1024, an on-vehicle electronic device signal creation part 1026, a transmission control part 1028 and a received signal analysis part 1030.

It is preferable that, according to an application (firmware) stored inside the MCU, the MCU implements the functions of the vehicle state determination part 1022, the transmission trial number of times designation part 1024, the on-vehicle electronic device signal creation part 1026, the transmission control part 1028 and the received signal analysis part 1030. Instead, it is also possible that, according to an application stored in a storage part (not shown), the MCU implements the functions of the vehicle state determination part 1022, the transmission trial number of times designation part 1024, the on-vehicle electronic device signal creation part 1026, the transmission control part 1028 and the received signal analysis part 1030.

The ECU 102 functions as the vehicle state determination part 1022. The vehicle state determination part 1022 determines whether the vehicle has a state of generating noise. It is preferable that the vehicle state determination part 1022 determines whether the vehicle has a state of generating noise that has a large influence on electronic waves in the LF band to be transmitted from the on-vehicle electronic device 100. Sources generating such noise include the engine, a motor(s) used for driving a wiper and so forth, other parts/components, and so forth. According to the vehicle state determination part 1022 in the embodiment, it is preferable that the vehicle state determination part 1022 determines that the vehicle has a state of generating noise in a case where the engine has been started up, in a case where a switch for the wiper or the like has been turned on, or in a case where a switch for another part/component has been turned on. Further, it is also possible that the vehicle state determination part 1022 determines that the vehicle has a state of generating noise based on a noise detection result from a noise detection unit (not shown). The vehicle state determination part 1022 then outputs information (hereinafter, referred to as "noise existence information") indicating whether the vehicle has a state of generating noise to the transmission trial number of times designation part 1024.

The ECU 102 also functions as the transmission trial number of times designation part 1024. The transmission trial number of times designation part 1024 is connected with the vehicle state determination part 1022. The transmission trial number of times designation part 1024 sets the number of times of trial of transmitting the encrypted communication code based on the "noise existence information" from the vehicle state determination part 1022. It is also possible that the transmission trial number of times designation part 1024 sets the number of times of trial of transmitting the wake-up signal based on the noise existence information from the vehicle state determination part 1022. The number of times of trial of transmitting the encrypted communication code and the number of times of trial of transmitting the wake-up signal may the same as one another, or may be different from one another. Concerning the ECU 102 according to the embodiment, a description will be made for a case where both the number of times of trial of transmitting the encrypted communication code and the number of times of trial of transmitting the wake-up signal are set, and, from a point of view of making the control easier, both the numbers of times are the same as one another (hereinafter, that may be referred to as the "number of times of trial of transmission").

In a case where the noise existence information from the vehicle state determination part 1022 indicates that the vehicle has a state of generating noise, the transmission trial number of times designation part 1024 sets "N" times as the "number of times of trial of transmission". In a case where the noise existence information from the vehicle state determination part 1022 indicates that the vehicle has a state of not generating noise, the transmission trial number of times designation part 1024 sets "two" times as the number of times of trial of transmission. The transmission trial number of times designation part 1024 inputs "on-vehicle device transmission trial number of times information" (indicating the number of times of trial of transmission") to the on-vehicle electronic device signal creation part 1026 and the transmission control part 1028.

The ECU 102 also functions as the on-vehicle electronic device signal creation part 1026. The on-vehicle electronic device signal creation part 1026 is connected with the transmission trial number of times designation part 1024. The on-vehicle electronic device signal creation part 1026 creates the wake-up signal including information designating the reception waiting period of time based on the "on-vehicle device transmission trial number of times information" from the transmission trial number of times designation part 1024. The on-vehicle electronic device transmission signal creation part 1026 inputs the thus created wake-up signal to the transmission control part 1028.

Figure 4:
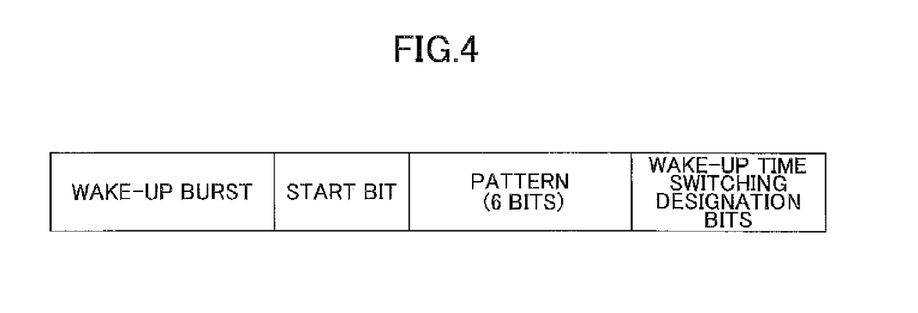
FIG. 4 shows a wake-up signal according to the embodiment.

FIG. 4 shows one example of the wake-up signal. The wake-up signal includes a wake-up burst, a start bit(s), a pattern and wake-up time switching designation bits.

The wake-up burst can cause the portable device 200 to enter a wake-up state.

The start bit(s) is a signal for causing the portable device 200 to know that a pattern is coming.

The pattern is a signal for causing the portable device 200 to determine whether to continue the wake-up state.

The wake-up time switching designation bits are information designating the reception waiting period of time in the portable device 200. That is, the portable device 200 continues the wake-up state for the reception waiting period of time indicated by the information that designates the reception waiting period of time.

Further, the on-vehicle electronic device signal creation part 1026 creates the encrypted communication code based on the on-vehicle device transmission trial number of times information from the transmission trial number of times designation part 1024. The on-vehicle electronic device signal creation part 1026 inputs the thus created encrypted communication code to the transmission control part 1028.

The ECU 102 also functions as the transmission control part 1028. The transmission control part 1028 is connected with the transmission trial number of times designation part 1024 and the on-vehicle electronic device signal creation part 1026. The transmission control part 1028 carries out control to transmit the wake-up signal and the encrypted communication code based on the on-vehicle device transmission trial number of times information from the transmission trial number of times designation part 1024.

The ECU 102 also functions as the received signal analysis part 1030. The received signal analysis part 1030 is connected with the transmission control part 1028. The received signal analysis part 1030 carries out a process of receiving a signal from the portable device 200. In a case of having received the affirmative response signal responding to the wake-up signal from the portable device 200, the received signal analysis part 1030 inputs to the transmission control part 1028 information indicating the fact of having received the affirmative response signal responding to the wake-up signal.

In a case of having been notified of having received the affirmative response signal responding to the wake-up signal by the received signal analysis part 1030, the transmission control part 1028 starts control to transmit the encrypted communication code.

Further, in a case of having received an affirmative response signal responding to the encrypted communication code from the portable device 200, the received signal analysis part 1030 notifies the transmission control part 1028 of having received the affirmative response signal responding to the encrypted communication code. In a case of having been notified of having received the affirmative response signal responding to the encrypted communication code by the received signal analysis part 1030, the transmission control part 1028 stops transmitting the encrypted communication code.

<Portable Device 200>

The portable device 200 includes a Central Processing Unit (CPU) 202, a receiving Integrated Circuit (IC) 204, a Low Frequency (LF band) receiving antenna 206, a transmission IC 208 and a Radio Frequency (RF) transmission antenna 210.

The LF receiving antenna 206 is an antenna for receiving electric waves in a LF band transmitted by the on-vehicle electronic device 100. Specifically, the LF receiving antenna 206 receives the wake-up signal and the encrypted communication code.

The receiving IC 204 is connected with the LF receiving antenna 206. The receiving IC 204 generates a received signal by demodulating electric waves in the LF band from the LF receiving antenna 206. Specifically, the receiving IC 204 obtains the wake-up time switching designation bits included in the wake-up signal by demodulating the wake-up signal. The receiving IC 204 inputs the thus obtained wake-up time switching designation bits to the CPU 202.

The CPU 202 is connected with the receiving IC 204.

<Functions of Portable Device 200>

Figure 5:
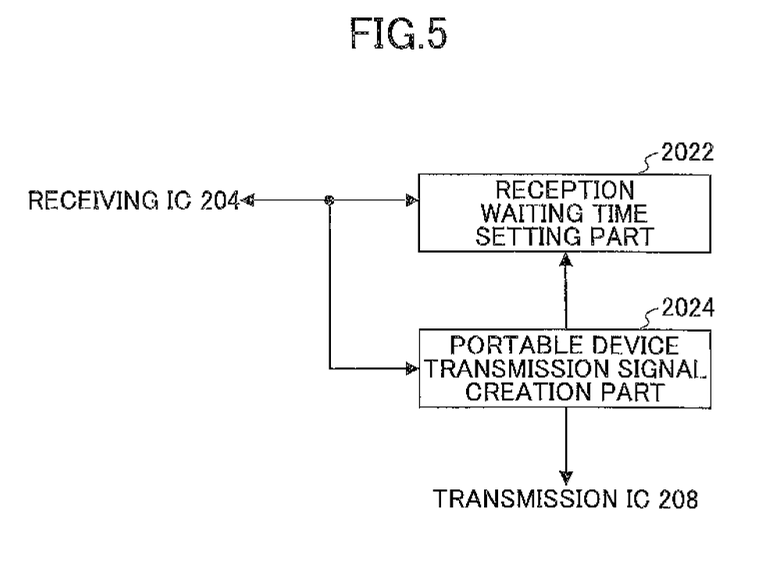
FIG. 5 is a functional block diagram showing a portable device according to the embodiment.

FIG. 5 is a functional block diagram showing the portable device 200 according to the embodiment.

The functions shown in the functional block diagram of FIG. 5 are implemented mainly by the CPU 202. That is, the CPU 202 functions as a reception waiting time setting part 2022 and a portable device transmission signal creation part 2024.

It is preferable that the functions of the reception waiting time setting part 2022 and the portable device transmission signal creation part 2024 are implemented by the CPU 202 according to an application (firmware) stored inside the CPU 202. Instead, it is also possible that the functions of the reception waiting time setting part 2022 and the portable device transmission signal creation part 2024 are implemented by the CPU 202 according to an application stored in a storage part (not shown).

The CPU 202 functions as the reception waiting time setting part 2022. The reception waiting time setting part 2022 sets the reception waiting period of time for receiving the encrypted communication code from the on-vehicle electronic device 100, based on the wake-up time setting designation bits from the receiving IC 204. The reception waiting time setting part 2022 causes the receiving IC 204 to enter a wake-up state according to the reception waiting period of time. In a case where the wake-up time switching designation bits indicate "2", the reception waiting time setting part 2022 keeps the reception waiting period of time as an initial value. It is preferable that the initial value of the reception waiting period of time is on the order of such a period of time that, during the period of time, transmission is carried out by the on-vehicle electronic device 100 two times. In a case where the wake-up time switching designation bits indicate "N", the reception waiting time setting part 2022 changes the reception waiting period of time into a reception waiting period of time T.

It is preferable that, in a case of having been notified of having received the encrypted communication code by the portable device transmission signal creation part 2024, the reception waiting time setting part 2022 returns the reception waiting period of time into the initial value after transmitting the response signal responding to the thus received encrypted communication code. Further, it is preferable that, also in a case where the encrypted communication code has not been received from the receiving IC 204 and also the reception waiting period of time has elapsed, the reception waiting time setting part 2022 returns the reception waiting period of time to the initial value.

The CPU 202 also functions as the portable device transmission signal creation part 2024. The portable device transmission signal creation part 2024 is connected with the reception waiting time setting part 2022, the receiving IC 204 and the transmission IC 208. The portable device transmission signal creation part 2024 creates the affirmative response signal responding to the wake-up signal in a case where the wake-up signal has been input from the receiving IC 204. The portable device transmission signal creation part 2024 inputs the thus created affirmative response signal responding to the wake-up signal into the transmission IC 208.

In a case where the encrypted communication code has been input from the receiving IC 204, the portable device transmission signal creation part 2024 notifies the reception waiting time setting part 2022 that the encrypted communication code has been received, and creates the response signal responding to the encrypted communication code. The thus created response signal responding to the encrypted communication code can be any one of an affirmative response signal or a negative response signal. The portable device transmission signal creation part 2024 inputs the response signal responding to the encrypted communication code into the transmission IC 208.

The transmission IC 208 is connected with the CPU 202. The transmission IC 208 modulates the affirmative response signal responding to the wake-up signal that is input from the CPU 202 into electric waves in UHF. The transmission IC 208 transmits the affirmative response signal responding to the wake-up signal that has been thus modulated into electric waves in UHF, through the RF transmission antenna 210.

Further, the transmission IC 208 modulates the response signal responding to the encrypted communication code that is input from the CPU 202 into electric waves in UHF. The transmission IC 208 transmits the response signal responding to the encrypted communication code that has been thus modulated into electric waves in UHF, through the RF transmission antenna 210.

The RF transmission antenna 210 is connected with the transmission IC 208. The RF transmission antenna 210 wirelessly transmits the affirmative response signal responding to the wake-up signal thus modulated into electric waves in UHF from the transmission IC 208.

Further, the RF transmission antenna 210 wirelessly transmits the affirmative response signal responding to the encrypted communication code thus modulated into electric waves in UHF from the transmission IC 208.

<Operations in Communications System>

Figure 6:
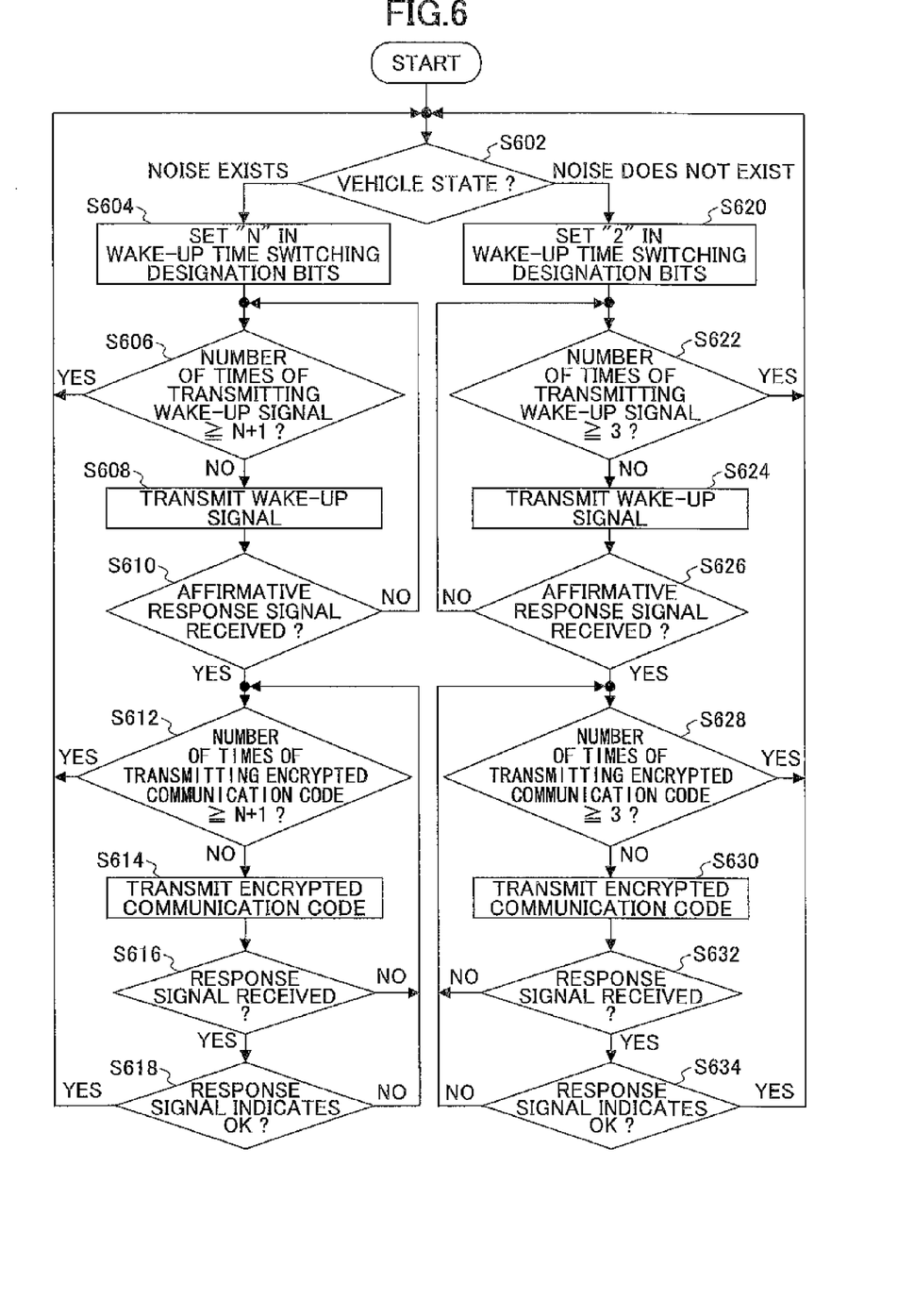
FIG. 6 is a flowchart showing operations in the on-vehicle electronic device according to the embodiment.
Figure 7:
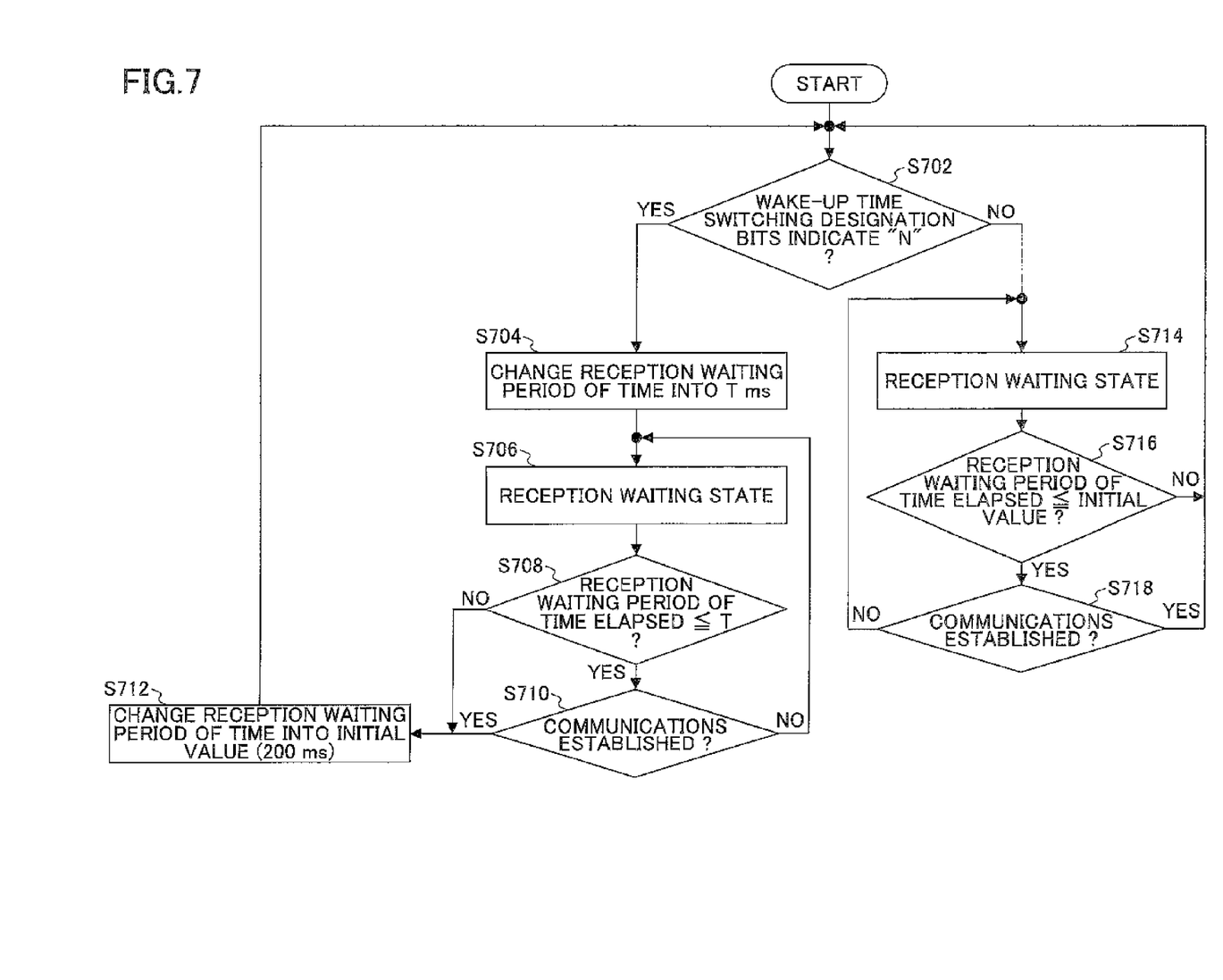
FIG. 7 is a flowchart showing operations in the portable device according to the embodiment.

FIGS. 6 and 7 show operations in the communications system according to the embodiment. FIG. 6 shows operations in the on-vehicle electronic device 100.

In step S602 in FIG. 6, the on-vehicle electronic device 100 determines the state in the vehicle. That is, the vehicle state determination part 1022 determines whether the vehicle is in a state of generating noise. It is preferable that the vehicle electronic device 100 determines the state in the vehicle in response to, as a trigger, any one(s) of a door having been opened and/or closed; the engine having been started up; and locking or unlocking having been carried out by a smart key system, for example.

Next, in step S604, in a case where it has been determined in step S602 that the vehicle is in a state of generating noise, the on-vehicle electronic device 100 sets "N" in the wake-up time switching designation bits. That is, the transmission trial number of times designation part 1024 sets N times as the number of times of trial of transmission ("on-vehicle device transmission trial number of times information") in a case where the noise existence information from the vehicle state determination part 1022 indicates a state of generating noise. The on-vehicle electronic device signal creation part 1026 creates the wake-up signal including the wake-up time switching designation bits based on the "on-vehicle device transmission trial number of times information" from the transmission trial number of times designation part 1024.

In step S606, the on-vehicle electronic device 100 determines whether the number of times of transmitting the wake-up signal is greater than or equal to N+1. At this time, the transmission control part 1028 has incremented the number of times of transmitting the wake-up signal by 1, and then, determines whether the number of times of transmitting the wake-up signal is greater than or equal to N+1. In a case where the number of times of transmitting the wake-up signal is greater than or equal to N+1, the number of times of transmitting the wake-up signal is reset to 0, and then, the process returns to step S602.

In a case of having determined that the number of times of transmitting the wake-up signal is less than N+1 in step S606, the on-vehicle electronic device 100 transmits the wake-up signal in step S608. That is, the transmission control part 1028 carries out control to transmit the wake-up signal in a case where it has been determined that the number of times of transmitting the wake-up signal is less than N+1.

In step S610, the on-vehicle electronic device 100 determines whether the affirmative response signal from the portable device 200 has been received. That is, the received signal analysis part 1030 determines, based on the received signal from the RF receiver 106, whether the received signal is the affirmative response signal responding to the wake-up signal. In a case where it has not been determined that the affirmative response signal has been received from the portable device 200, the process returns to step S606.

In a case where it has been determined in step S610 that the affirmative response signal has been received from the portable device 200, the number of times of transmitting the wake-up signal is reset to 0. Then, in step S612, the on-vehicle electronic device 100 determines whether the number of times of transmitting the encrypted communication code is greater than or equal to N+1. In step S612, the transmission control part 1028 has incremented the number of times of transmitting the encrypted communication code by 1, and then, determines whether the number of times of transmitting the encrypted communication code is greater than or equal to N+1. In a case where the number of times of transmitting the encrypted communication code is greater than or equal to N+1 in step S612, the number of times of transmitting the encrypted communication code is reset to 0, and then, the process returns to step S602.

In a case where the number of times of transmitting the encrypted communication code is less than N+1 in step S612, the on-vehicle electronic device 100 transmits the encrypted communication code in step S614. That is, the transmission control part 1028 carries out control to transmit the encrypted communication code in a case where the number of times of transmitting the encrypted communication code is less than N+1.

In step S616, the on-vehicle electronic device 100 determines whether the response signal responding to the encrypted communication code has been received from the portable device 200. That is, the received signal analysis part 1030 determines, based on the received signal from the RF receiver 106, whether the received signal is the response signal responding to the encrypted communication code. In a case where it has not been determined that the response signal from the portable device 200 has been received, the process returns to step S612.

In a case where it has been determined in step S616 that the response signal has been received, the on-vehicle electronic device 100 determines whether the response signal is an affirmative (OK) response signal or a negative (not OK) response signal in step S618. That is, the response signal analysis part 1030 determines, based on the received signal from the RF receiver 106, whether the response signal is the affirmative response signal or the negative response signal. In a case of the negative response signal, the process returns to step S612. In a case of the affirmative response signal, the number of times of transmitting the encrypted communication code is reset into zero, and the process returns to step S602. Note that, when the "affirmative response signal" (responding to the encrypted communication code) has been received, as described later in the description of FIG. 7, this means that the communications with the portable device 200 have been established, and thus, the on-vehicle electronic device 100 will then accept operations of locking or unlocking a door, starting up the engine or the like by a user via the portable device 200.

In step S620, in a case where it has been determined in step S602 that the vehicle is in a state of not generating noise, the on-vehicle electronic device 100 sets "2" in the wake-up time switching designation bits. That is, the transmission trial number of times designation part 1024 then sets "two times" as the number of times of trial of transmission ("on-vehicle device transmission trial number of times information") in a case where the noise existence information from the vehicle state determination part 1022 indicates a state of not generating noise. The on-vehicle electronic device signal creation part 1026 creates the wake-up signal including the wake-up time switching designation bits based on the "on-vehicle device transmission trial number of times information" from the transmission trial number of times designation part 1024.

In step S622, the on-vehicle electronic device 100 determines whether the number of times of transmitting the wake-up signal is greater than or equal to 3. That is, the transmission control part 1028 has incremented the number of times of transmitting the wake-up signal by 1, and then, determines whether the number of times of transmitting the wake-up signal is greater than or equal to 3. In a case where the number of times of transmitting the wake-up signal is greater than or equal to 3, the number of times of transmitting the wake-up signal is reset to 0, and then, the process returns to step S602.

In a case of having determined that the number of times of transmitting the wake-up signal is less than 3 in step S622, the on-vehicle electronic device 100 transmits the wake-up signal in step S624. That is, the transmission control part 1028 carries out control to transmit the wake-up signal in a case where it has been determined that the number of times of transmitting the wake-up signal is less than 3.

In step S626, the on-vehicle electronic device 100 determines whether the affirmative response signal from the portable device 200 has been received. That is, the received signal analysis part 1030 determines, based on the received signal from the RF receiver 106, whether the received signal is the affirmative response signal responding to the wake-up signal. In a case where it has not been determined that the affirmative response signal has been received from the portable device 200, the process returns to step S622.

In a case where it has been determined that the affirmative response signal has been received from the portable device 200 in step S626, the number of times of transmitting the wake-up signal is reset to 0. Then, the on-vehicle electronic device 100 determines in step S628 whether the number of times of transmitting the encrypted communication code is greater than or equal to 3. In step S628, the transmission control part 1028 has incremented the number of times of transmitting the encrypted communication code by 1, and then, determines whether the number of times of transmitting the encrypted communication code is greater than or equal to 3. In a case where the number of times of transmitting the encrypted communication code is greater than or equal to 3 in step S628, the number of times of transmitting the encrypted communication code is reset to 0, and then, the process returns to step S602.

In a case where the number of times of transmitting the encrypted communication code is less than 3 in step S628, the on-vehicle electronic device 100 transmits the encrypted communication code in step S630. That is, the transmission control part 1028 carries out control to transmit the encrypted communication code in a case where the number of times of transmitting the encrypted communication code is less than 3.

In step S632, the on-vehicle electronic device 100 determines whether the response signal responding to the encrypted communication code has been received from the portable device 200. That is, the received signal analysis part 1030 determines, based on the received signal from the RF receiver 106, whether the received signal is the response signal responding to the encrypted communication code. In a case where it has not been determined that the response signal from the portable device 200 has been received, the process returns to step S628.

In a case where it has been determined in step S632 that the response signal has been received, the on-vehicle electronic device 100 determines whether the response signal is an affirmative (OK) response signal or a negative (not OK) response signal in step S634. That is, the response signal analysis part 1030 determines, based on the received signal from the RF receiver 106, whether the response signal is the affirmative response signal or the negative response signal. In a case of the negative response signal, the process returns to step S628. In a case of the affirmative response signal, the number of times of transmitting the encrypted communication code is reset into zero, and the process returns to step S602. Note that, when the "affirmative response signal" (responding to the encrypted communication code) has been received, as described later in the description of FIG. 7, this means that the communications with the portable device 200 have been established, and thus, the on-vehicle electronic device 100 will then accept operations of locking or unlocking a door, starting up the engine or the like by a user via the portable device 200.

FIG. 7 shows operations in the portable device 200 according to the embodiment.

In a case of having received the wake-up signal from the on-vehicle electronic device 100, the portable device 200 reads the wake-up time switching designation bits from the received wake-up signal, and determines whether the wake-up time switching designation bits indicate N, in step S702. That is, the reception waiting time setting part 2022 determines whether N is set in the wake-up time switching designation bits from the receiving IC 204.

In a case where it has been determined in step S702 that N has been set in the wake-up time switching designation bits, the portable device 200 sets the reception waiting period of time as "T" in step S704. That is, the reception waiting time setting part 2022 sets the reception waiting period of time corresponding to "N" that has been thus obtained from the wake-up time switching designation bits. That is, the reception waiting time setting part 2022 changes the reception waiting period of time from the initial value into "T".

In step S706, the portable device 200 enters a reception waiting state. That is, the reception waiting time setting part 2022 controls the receiving IC 204 to cause it to be in a wake-up state for the reception waiting period of time.

In step S708, the portable device 200 determines whether the reception waiting period of time elapsed is less than or equal to "T". That is, the reception waiting time setting part 2022 determines whether the reception waiting period time elapsed is less than or equal to the reception waiting period of time "T".

In a case where it has been determined in step S708 that the reception waiting period of time elapsed is less than or equal to T, the portable device 200 determines in step S710 whether communications have been established. Specifically, in a case where the encrypted communication code has been received from the on-vehicle electronic device 100, the portable device transmission signal creation part 2024 determines that communications have been established. In a case where communications have not been established, the portable device 200 transmits the negative response signal to the on-vehicle electronic device 100, and the process returns to step S706.

In a case where it has been determined in step S708 that the reception waiting period time elapsed exceeds the reception waiting period of time T, or in a case where it has been determined in step S710 that communications have been established, the portable device 200 changes the reception waiting period of time into the initial value, and the reception waiting period of time elapsed is reset to 0, in step S712. That is, the reception waiting time stetting part 2022 changes the reception waiting period of time into the initial value in a case where it has been determined in step S708 that the reception waiting period time elapsed exceeds the reception waiting period of time T or in a case where it has been determined in step S710 that communications have been established, and the process returns to step S702. Note that when it has been determined in step S710 that the communications have been established, the portable device 200 transmits the affirmative response signal to the on-vehicle electronic device 100. As mentioned above, when the "affirmative response signal" (responding to the encrypted communication code) has been thus transmitted to the on-vehicle electronic device 100, the on-vehicle electronic device 100 that has received it will then accept operations of locking or unlocking a door, starting up the engine or the like by a user via the portable device 200.

In a case where it has been determined in step S702 that "N" cannot be obtained from the wake-up time switching designation bits, i.e., "2" can be obtained from the wake-up time switching designation bits, the portable device 200 enters a reception waiting state in step S714. During a period of time in which the portable device 200 is in the reception waiting state, the reception waiting time setting part 2022 controls the receiving IC 204 to cause it to be in a wake-up state.

In step S716, the portable device 200 determines whether the reception waiting period of time elapsed is less than or equal to the initial value of the reception waiting period of time. That is, the reception waiting time setting part 2022 determines whether the reception waiting period of time elapsed is less than or equal to the initial value of the reception waiting period of time.

In a case where it has been determined in step S716 that the reception waiting period of time elapsed is less than or equal to the initial value of the reception waiting period of time, the portable device 200 determines in step S718 whether communications have been established. That is, in a case where the encrypted communication code has been received from the on-vehicle electronic device 100, the portable device transmission signal creation part 2024 determines that communications have been established. In a case where communications have not been established, the portable device 200 transmits the negative response signal to the on-vehicle electronic device 100, and the process returns to step S714. In a case where communications have been established, the reception waiting period of time elapsed is reset into zero, the portable device 200 transmits the affirmative response signal to the on-vehicle electronic device 100, and the process returns to step S702. Note that, as mentioned above, when the "affirmative response signal" (responding to the encrypted communication code) has been thus transmitted to the on-vehicle electronic device 100, the on-vehicle electronic device 100 that has received it will then accept operations of locking or unlocking a door, starting up the engine or the like by a user via the portable device 200.

According to the communications system in the embodiment, depending on the current state in the vehicle as to whether noise is being generated, the on-vehicle electronic device 100 controls not only the number of times of transmitting the encrypted communication code, but also a period of time of causing the portable device to be in a wake-up state.

As a result of a period of time of causing the portable device to be in a wake-up state being thus controlled depending on the current state in the vehicle as to whether noise is being generated, it is possible to suppress degradation in responsiveness that may be otherwise degraded due to an increase in a communication period of time between the on-vehicle electronic device 100 and the portable device 200, and it is possible to reduce the frequency of failing in communications between the on-vehicle electronic device 100 and the portable device 200.

It is possible to increase the frequency of establishing communications between the on-vehicle electronic device 100 and the portable device 200 by separately increasing the number of times of transmitting the encrypted communication code (see FIG. 2) in comparison to a case of increasing both the number of times of transmitting the wake-up signal and the number of times of transmitting the encrypted communication code together. In order to prove this point, a case will be assumed where retry of transmitting the encrypted communication code and retry of transmitting the wake-up signal are carried out and both the number of times of transmitting the encrypted communication code and the number of times of transmitting the wake-up signal are increased together as in the related art. In this case, in an environment of noise being generated, "A" (<1) denotes a probability of succeeding in receiving the wake-up signal by the portable device and "B" (<1) denotes a probability of succeeding in receiving the encrypted communication code by the portable device. Further, "N" denotes the number of times of retry. In order that communications are to be finally established, both reception of the wake-up signal and reception of the encrypted communication code by the portable device should be succeeded in together. Therefore, the probability of finally establishing communications is obtained from the multiplication of "A×B×N" in this case. In contrast thereto, according to the communications system in the embodiment, it is sufficient that reception of the wake-up signal and reception of the encrypted communication code should be separately succeeded in. Therefore, according to the embodiment, the probability of finally establishing communications is obtained from the multiplication of "A×N×B×N". Thus, it is possible to improve the probability of finally establishing communications according to the embodiment in comparison to the related art. Thus, it is possible to improve noise resistance.

Further, according to the related art, the reception waiting period of time in the portable device is fixed, and counting therefor is started in the portable device after the wake-up signal is received. Therefore, in order to increase a sum total of the reception waiting periods of time for improving the frequency of finally establishing communications, it is necessary to increase the number of times of retry of transmitting the wake-up signal and the number of times of retry of transmitting the encrypted communication code together. In contrast thereto, according to the communications system in the embodiment, since the wake-up signal includes information for designating the reception waiting period of time, it is possible to increase the reception waiting period of time separately, and increase the number of times of retry of transmitting the encrypted communication code only, without increasing the number of times of retry of transmitting the wake-up signal (see FIG. 2).

Further, in a case of carrying out communications in an environment of noise being generated, it is possible to reduce the frequency of entering a wake-up state by the portable device 200 as a result of the on-vehicle electronic device 100 transmitting the wake-up signal that designates a longer reception waiting period of time. Thereby, it is possible to reduce the power consumption in the on-vehicle electronic device 100 and also the power consumption in the portable device 200. Also, it is possible to extend the battery life in the portable device 200 by thus reducing the power consumption in the portable device 200.

Further, according to the embodiment, by controlling a period of time of causing the portable device 200 to be in a wake-up state, it is possible to avoid such a problematic situation that the encrypted communication code transmitted from the on-vehicle electronic device 100 cannot be received by the portable device 200 due to entering a state of not being able to receive it by the portable device 200.

In other words, according to the embodiment, by increasing the number of times of transmitting the encrypted communication code, it is possible to improve noise resistance and also, it is possible to reduce, as much as possible, delay in operations otherwise being increased due to an increase in a required communication period of time and degradation in battery life in the portable device 200.

Variant of Embodiment

A variant of the embodiment will now be described.

The variant of the embodiment is different from the above-described embodiment in that the wake-up time switching designation bits included in the wake-up signal include information indicating the reception waiting period of time according to the variant of the embodiment.

It is preferable that the on-vehicle electronic device 100 designates "two" times or "N" times ("N" is an integer and is greater than 2) as the number of times of trial of transmission. The on-vehicle electronic device 100 sets information indicating the initial value of the reception waiting period of time in the wake-up time switching designation bits in a case of designating "two" times as the number of times of trial of transmission. The on-vehicle electronic device 100 sets information indicating the reception waiting period of time "T" in the wake-up time switching designation bits in a case of designating "N" times as the number of times of trial of transmission.

When having received the wake-up signal from the on-vehicle electronic device 100, the portable device 200 transmits the affirmative response signal (ACK signal) responding to the wake-up signal. Further, the portable device 200 sets the reception waiting period of time according to the wake-up time switching designation bits included in the wake-up signal. In a case where the wake-up time switching designation bits indicate the initial value of the reception waiting period of time, the portable device 200 continues to be in the state of having the initial value that has been set as the reception waiting period of time. In a case where the wake-up time switching designation bits indicate the reception waiting period of time "T", the portable device 200 changes the reception waiting period of time into the reception waiting period of time "T". The portable device 200 waits for a signal from the on-vehicle electronic device 100 for the reception waiting period of time.

According to the communications system in the variant of the embodiment, the wake-up signal including the "reception waiting period of time" information is transmitted, and thus, the portable device 200 does not need to convert the number of times of trial of transmission into the reception waiting period of time as in the above-mentioned embodiment. Therefore, in a case where the reception waiting period of time itself is to be changed, such a change can be implemented by changing the information to be transmitted from the on-vehicle electronic device 100.

Thus, the communications systems, on-vehicle electronic devices and communication methods have been described by the embodiment and the variant of the embodiment. However, the embodiment and the variant of the embodiment have been described merely for illustrative purposes, and persons skilled in the art can understand, therefrom, various variants, modifications, replacements and so forth. For the sake of convenience in description, the devices according to the embodiment and the variant of the embodiment have been described using the functional block diagrams. However, these devices may be implemented by hardware, software or combinations thereof. The present invention is not limited to the above-mentioned embodiment and variant of the embodiment, and various variants, modifications and replacements can be devised within the scope and spirit of the invention as described and defined in the following claims.

The present application is based on Japanese Priority Application No. 2013-032141, filed on Feb. 21, 2013, the entire contents of which are hereby incorporated herein by reference.

The invention claimed is:

1. A communications system comprising:
an on-vehicle electronic device; and
a portable device that communicates with the on-vehicle electronic device, wherein
the on-vehicle electronic device includes a processor programmed to:
create a first signal that causes the portable device to enter a state of being able to carry out reception and a second signal to be transmitted to the portable device,
designate a number of times of transmitting the second signal, and
control transmission of the first signal and transmission of the second signal, wherein
the first signal is created to include information for setting a period of time of causing the portable device to enter the state of being able to carry out reception in a state of noise being generated longer than one that is set in a state of noise not being generated,
the designated number of times of transmitting the second signal in the state of noise being generated is greater than one that is designated in the state of noise not being generated, and
transmission of the second signal is controlled based on the designated number of times of transmitting the second signal, and
the portable device includes a processor programmed to set, according to the period of time of causing the portable device to enter the state of being able to carry out reception included in the first signal from the on-vehicle electronic device, a period of time of entering a state of being able to carry out reception.

2. The communications system as claimed in claim 1, wherein
the processor of the on-vehicle electronic device is further programmed to determine whether a vehicle is in the state of noise being generated, and
create the first signal that includes information for setting the period of time of causing the portable device to enter the state of being able to carry out reception longer than one that is set in the state of noise not being generated, in a case where the vehicle is determined to be in the state of noise being generated.

3. The communications system as claimed in claim 2, wherein
the on-vehicle electronic device has a signal receiver that receives a signal from the portable device, and
the processor of the on-vehicle electronic device is further programmed to stop transmission of the second signal in a case where the signal receiver has received a response signal that responds to the second signal.

4. The communications system as claimed in claim 3, wherein
the first signal includes a wake-up signal, and
the second signal includes an encrypted communication code.

5. The communications system as claimed in claim 2, wherein
the first signal includes a wake-up signal, and
the second signal includes an encrypted communication code.

6. The communications system as claimed in claim 1, wherein
the on-vehicle electronic device further includes a signal receiver that receives a signal from the portable device, and
the processor of the on-vehicle electronic device is further programmed to stop transmission of the second signal in a case where the signal receiver has received a response signal that responds to the second signal.

7. The communications system as claimed in claim 6, wherein
the first signal includes a wake-up signal, and
the second signal includes an encrypted communication code.

8. The communications system as claimed in claim 1, wherein
the first signal includes a wake-up signal, and
the second signal includes an encrypted communication code.

9. An on-vehicle electronic device communicating with a portable device, comprising:
a processor programmed to:
create a first signal that causes the portable device to enter a state of being able to carry out reception and a second signal to be transmitted to the portable device;
designate the number of times of transmitting the second signal; and
control transmission of the first signal and transmission of the second signal, wherein
the first signal is created to include information for setting a period of time of causing the portable device to enter the state of being able to carry out reception in a state of noise being generated longer than one that is set in a state of noise not being generated,
the designated number of times of transmitting the second signal in the state of noise being generated is greater than one that is designated in the state of noise not being generated, and
transmission of the second signal is controlled based on the designated number of times of transmitting the second signal.

10. A communication method comprising:
creating, by an on-vehicle electronic device, a first signal that causes a portable device to enter a state of being able to carry out reception and a second signal to be transmitted to the portable device;
designating, by the on-vehicle electronic device, the number of times of transmitting the second signal; and
controlling, by the on-vehicle electronic device, transmission of the first signal and transmission of the second signal, wherein
in the creating, the first signal is created that includes information for setting a period of time of causing the portable device to enter the state of being able to carry out reception in a state of noise being generated longer than one that is set in a state of noise not being generated, in the designating, the number of times of transmitting the second signal is designated in the state of noise being generated greater than one that is designated in the state of noise not being generated, and in the controlling, transmission of the second signal is controlled based on the designated number of times of transmitting the second signal.

11. The communication method as claimed in claim 10, further comprising:

setting, by the portable device, according to the period of time of causing the portable device to enter the state of being able to carry out reception included in the first signal from the on-vehicle electronic device, a period of time of entering a state of being able to carry out reception.

* * * * *